United States Patent [19]

Bunkoczy

[11] Patent Number: 4,817,855
[45] Date of Patent: Apr. 4, 1989

[54] PRESSURE VESSEL

[75] Inventor: Bela Bunkoczy, Chandler, Ariz.

[73] Assignee: Allied-Signal Inc., Morris Township, Morris County, N.J.

[21] Appl. No.: 183,797

[22] Filed: Apr. 20, 1988

Related U.S. Application Data

[60] Continuation-in-part of Ser. No. 13,219, Feb. 6, 1987, which is a continuation-in-part of Ser. No. 767,228, Nov. 19, 1986, abandoned, which is a division of Ser. No. 659,606, Dec. 31, 1985, Pat. No. 4,561,476.

[51] Int. Cl.⁴ .......................... B23K 3/02; B23K 33/00
[52] U.S. Cl. .................... 228/171; 228/184; 244/117 A; 244/158 A; 220/75; 220/76
[58] Field of Search ............. 228/171, 184; 29/2.1, 29/412, 417, 463; 220/75, 76, 5 A, 3; 244/158 A, 117 A

[56] References Cited

U.S. PATENT DOCUMENTS 3,113,750 12/1963 Beardsley ................. 244/158 A
4,318,491 3/1982 Nelson et al. ................. 220/1 B

FOREIGN PATENT DOCUMENTS 1048872 11/1966 United Kingdom ........... 244/117 A

OTHER PUBLICATIONS

"Aviation Week", p. 61, Oct. 12, 1959.

Primary Examiner—Fred A. Silverberg
Assistant Examiner—Samuel M. Heinrich
Attorney, Agent, or Firm—Terry L. Miller; James W. McFarland

[57] ABSTRACT

A toroidal pressure vessel storing pressurized gas defines an outwardly exposed axially extending structural part of an automotive vehicle. Heat transfer from outside the vehicle directly to the pressure vessel advantageously offsets gas-expansion refrigeration effect when gas is used from the vessel.

20 Claims, 1 Drawing Sheet

PRESSURE VESSEL

CROSS REFERENCE TO RELATED APPLICATIONS

This is a continuation-in-part of co-pending application Ser. No. 013,219, filed 2/6/87, which is a continuation-in-part of application Ser. No. 767,228, filed 11/19/86, abandoned; which is a divisional application of application Ser. No. 659,606, filed 12/31/85, now U.S. Pat. No. 4,561,476.

TECHNICAL FIELD

This invention relates to a pressure vessel. More particularly, this invention relates to a toroidal pressure vessel defining a portion of the airframe structure of an airborne dirigible vehicle. As such, the pressure vessel is outwardly exposed to aerodynamic heating during high speed flight of the vehicle. The aerodynamic heating of the vessel assists in obtaining a greater utilization of pressurized fluid stored therein and used during vehicle flight.

Toroidal pressure vessels are known in the rocket and missile art, and are commonly used to store high pressure fluid. The stored high pressure fluid, such as nitrogen or argon, is used for powering various systems of the missile in flight. For example, one common use for a toroidal pressure vessel is for storage of high pressure nitrogen gas which during missile flight is employed in pneumatic actuators to control the positions of aerodynamic fins on the missile. By control of the fin positions, the missile is steered in flight toward its objective.

Conventional toroidal pressure vessels are mounted within and supported by the airframe structure of the vehicle. During utilization of the high pressure stored gas from a conventional pressure vessel, the expanding gas cools the vessel and the gas yet remaining therein. This cooling of the vessel and remaining gas results in a less than optimum utilization effectiveness for the stored gas. An additional increment of stored gas volume and pressure vessel size must be provided to compensate for the decreased utilization resulting from such gas expansion cooling.

In view of the above, it is apparent that the size and weight of vehicles using conventional toroidal pressure vessels are adversely increased by the need to provide both an additional increment of gas storage volume and vessel size to offset the cooling effect experienced during gas use, and by the need to provide vehicle structure to enclose and support the pressure vessel.

DISCLOSURE OF THE INVENTION

In view of the shortcomings of conventional toroidal pressure vessels, the present invention provides a toroidal pressure vessel defining a longitudinally extending portion of the airframe structure of an airborne vehicle. The toroidal pressure vessel includes integral provision at each end thereof for structurally interfacing with the remainder of the airframe structure both forward and aft of the pressure vessel. The pressure vessel also defines a portion of the exterior surface or skin of the vehicle. Consequently, during flight of the vehicle at high speed, the inventive pressure vessel is directly exposed to beneficial aerodynamic heating from the high speed air flow external to the vehicle. This aerodynamic heating offsets the gas expansion cooling effect which is so detrimental with conventional pressure vessels. The required gas storage volume and pressure vessel size may be reduced in comparison to conventional storage vessels. Also, the vehicle itself may be smaller and lighter because the toroidal pressure vessel is smaller and lighter, and because structure to enclose and support the vessel is eliminated.

Additionally, the present invention provides a toroidal pressure vessel of the above-described character wherein the vessel further defines a pair of longitudinally spaced and adjacent toroidal chambers which communicate internally of the vessel for gas storage. The vessel is a unitary body composed of three component parts united by welding. The weld seams uniting adjacent sections of the vessel extend circumferentially and are offset from one another both axially and radially to allow the welding operations necessary during manufacture of the pressure vessel to be performed more easily. Also, the welding operations on the seams within the central opening of the toroid are spaced toward the ends of the vessel. These welds may, therefore, be made without the need to reach deeply into the central passage of the vessel with the welding tool.

Additional objects and advantages of the present invention will be apparent from a reading of the following description of a single preferred embodiment of the invention taken in conjunction with the appended drawing figures, of which:

BEST MODE FOR CARRYING OUT THE INVENTION

Figure 1:
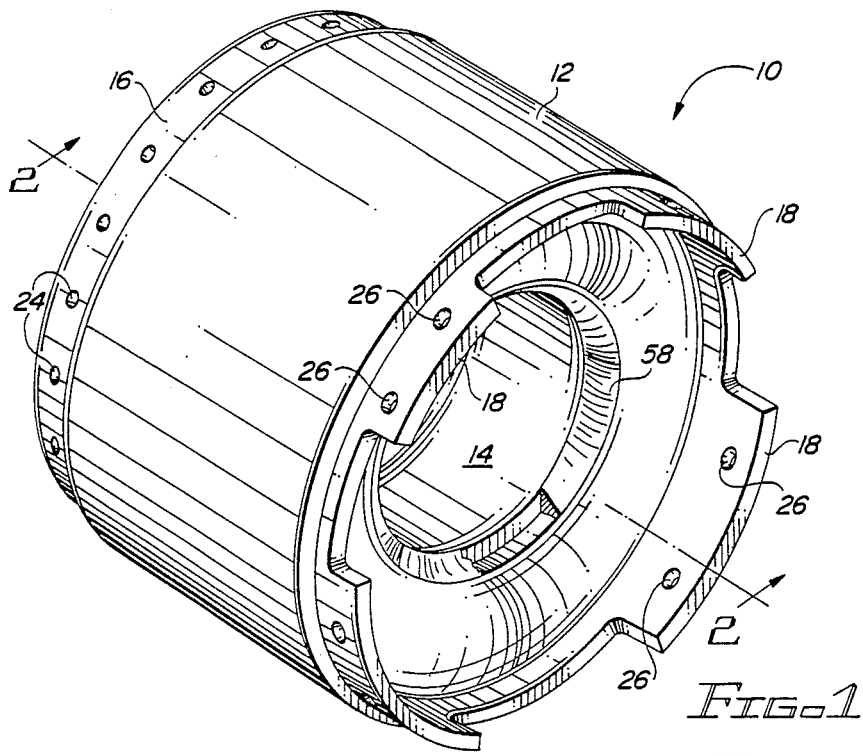
FIG. 1 presents an isometric view of a toroidal pressure vessel according to the present invention.
Figure 2:
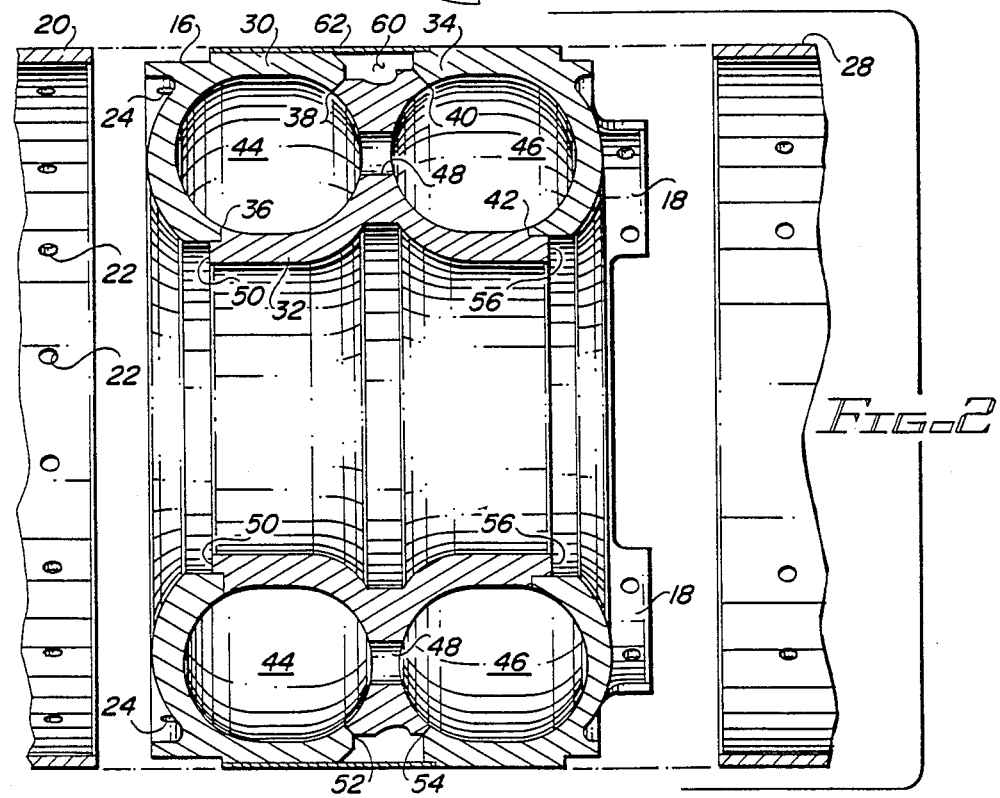
FIG. 2 provides a cross sectional view of the toroidal pressure vessel depicted in FIG. 1, and taken along the line 2—2 thereof.

FIGS. 1 and 2 depict a toroidal pressure vessel according to the present invention. The vessel (10) defines an axially extending circumferentially continuous radially outer surface (12) and an axial passage (14) extending through the vessel from one end to the other. It will be seen viewing FIG. 1 that the vessel (10) also includes axially extending circumferential flanges (16) and (18) at opposite ends thereof whereby the vessel (10) may be secured to respective axially adjacent portions of the airframe of an automotive vehicle. By way of example, FIG. 2 depicts an axially adjacent portion of a vehicle (20) which may be secured to the flange (16) by a plurality of fasteners (not shown) passing through a like plurality of passages (22) in the vehicle portion (20) and being received in matching passages (24) defined in the flange (16). It will be understood particularly viewing FIG. 2 that a flange (18) at the opposite end of pressure vessel (10) is configured as a plurality of circumferentially spaced tabs and similarly defines a plurality of radially extending passages (26) through which a plurality of fasteners similarly may pass to engage an adjacent vehicle portion (28). Thus it will be seen that the toroidal pressure vessel (10) is a structural part of the vehicle including portions (20) and (28) and, in fact, defines an axially extending part of the radially outer skin or radially outer wall of the vehicle itself. That is, the surface (12) of pressure vessel (10) defines a part of the outer surface of the vehicle. Conveniently, the adjacent portions of the vehicle (20) and (28) may communicate with one another, for example, by electrical, pneumatic or hydraulic lines which pass therebetween via the passage (14) of the toroidal pressure vessel (10).

Viewing now FIG. 2 in greater detail, it will be seen that the toroidal pressure vessel (10) includes three axially stacked annular sections (30), (32), and (34) which cooperatively define four circumferentially extending joint lines (36), (38), (40), and (42) therebetween. The sections (30) and (34) are generally C-shaped in axial cross section, while the section therebetween, section (32), is generally T-shaped in axial section. It will be noted that the pairs of joint lines (36,38), and (40,42) between each axially adjacent two of the sections (30–34) are offset both axially and radially from one another. The axially stacked sections (30) through (34) cooperatively define a pair of axially adjacent toroidal chambers (44) and (46). These chambers (44) and (46) are communicated with one another by one or more axially extending passages (48) defined by the axial section (32).

It will also be seen viewing FIG. 2 that the sections (30), (32), and (34) cooperatively define a respective axially and radially disposed circumferentially extending groove (50), (52), (54) and (56) at each of the joint lines (36) through (42). During manufacture of the toroidal pressure vessel (10) these grooves are employed to receive weld metal which sealingly unites the sections (30), (32), and (34) permanently with one another. While it will be appreciated that the welding operation mentioned above obliterates the joint detail at joint lines (36), (38), (40), and (42), it will be seen that the joint lines (36) and (42) are L-shaped and are defined by truly radially extending abutment surfaces intersecting with truly axially extending abutment surfaces defined by each adjacent section. This results in a joint of the bell-and-spigot type at the joint lines (36) and (42). On the other hand, at the joint lines (38) and (40) the adjacent sections of the toroidal pressure vessel define simple axially and radially extended bevel abutment surfaces. The cooperative engagement of the bell-and-spigot type joint between each of the axially adjacent two of the toroidal pressure vessel sections (30–32), and (32–34) along with the bevel abutment surfaces at joint lines (38) and (40) insures proper radial and axial alignment of the adjacent sections during manufacture of the toroidal pressure vessel (10).

During these manufacturing operations each of the circumferentially extending V-shaped grooves (50) through (56) is filled with weld metal as is depicted at (58) viewing FIG. 1 such that the joint detail previously described is obliterated. That is, the welding process fuses through the parent metal of the adjacent toroidal pressure vessel sections and fills the weld grooves (50-56) with weld metal. It is important to note that the radially inner joint lines (36) and (42) and their respective V-shaped weld grooves (50) and (56) are disposed axially apart at opposite axial ends of the toroidal pressure vessel (10). This disposition of the weld grooves (50) and (56) allows the weld operations thereat to be performed without the need for inserting a welding tool deeply into the central through passage (14). Also the radially outer joint lines (38) and (40) and their respective V-shaped weld grooves (52) and (54) are disposed in a radially outwardly extending circumferential recess (60) defined radially outwardly of the section (32) and between the sections (30) and (34) of toroidal pressure vessel (10). This allows the weld grooves (52) and (54) to be properly and completely filled with weld metal during manufacture of the toroidal pressure vessel (10).

After completion of the welding operation a relatively thin circumferentially continuous cover member (62) is installed to span the recess (60). The cover (62) provides a smooth axially extending outer surface for the toroidal pressure vessel (10).

As a result of the toroidal pressure vessel (10) defining an axially extending structural portion of the automotive vehicle including the pressure vessel (10) and also defining an axially extending radially outer portion of the skin of the vehicle, aerodynamic heating which may occur surrounding the vehicle during high speed atmospheric flight is transferred directly into the material of the pressure vessel (10). This direct aerodynamic heating of the pressure vessel (10) in part offsets the cooling effect which results from expansion of pressurized fluid stored in the pressure vessel (10). The result is that a higher stored gas utilization percentage or efficiency is realized because of the aerodynamic heating of the pressure vessel (10) than would result if this heating were not available.

While the present invention has been depicted and described by reference to a single preferred embodiment thereof, no limitation upon the invention is implied by such reference and no such limitation is to be inferred. The invention is intended to be limited only by the spirit and scope of the appended claims which provide additional definition of the invention.

What is claimed is:

1. A toroidal pressure vessel comprising a first annular part and a complementary second annular part, said first part and said second part cooperating to bound a toroidal chamber therewithin, said first part and said second part further cooperating to define a pair of circumferentially extending joints which are spaced apart both axially and radially, means sealingly uniting said first part and said second part at said pair of joints, axially extending structural interface means integral with said toroidal pressure vessel for allowing the latter to define a longitudinal portion of an elongate airframe structure, and said vessel defining radially outwardly disposed surface means in heat transfer relation therewith for both defining a longitudinal outer surface portion of said airframe structure and conducting aerodynamic heating from external of said airframe structure into said pressure vessel.

2. The invention of claim 1 wherein said structural interface means includes means extending in opposite axial directions for structurally interfacing both with a forward portion of said airframe structure and with an aft portion thereof.

3. The invention of claim 1 wherein said structural interface means includes an axially and circumferentially extending flange proximate to said radially outwardly disposed surface means.

4. The invention of claim 1 wherein said structural interface means includes a plurality of circumferentially spaced apart tabs which each extend circumferentially and radially to cooperatively form a circumferential array.

5. The invention of claim 1 wherein said radially outwardly disposed surface means comprises a radially outward wall of said toroidal pressure vessel defining a radially outwardly disposed axially extending cylindrical surface, said cylindrical surface defining said surface means.

6. The invention of claim 1 wherein said pressure vessel includes a third annular part, said third annular part cooperating with one of said first annular part and second annular part to bound a second toroidal chamber therewithin, said third annular part further cooperating with said one annular part to define a second pair of circumferentially extending joints which are spaced apart both axially and radially, and means sealingly uniting said third annular part with said one annular part at said second pair of joints.

7. The invention of claim 6 wherein each of said first annular part, said second annular part, and said third annular part cooperatively define said surface means.

8. The invention of claim 6 further including means communicating said toroidal chamber and said second toroidal chamber one with the other.

9. The method of providing a supply of pressurized gas within an airborne vehicle comprising the steps of:
providing a toroidal pressure vessel defining a longitudinally extending structural portion of said vehicle;
utilizing a radially outer wall of said pressure vessel to define a radially outwardly disposed longitudinal portion of an outer surface of said vehicle;
storing pressurized gas within said pressure vessel;
controllably releasing said stored gas from said pressure vessel during flight of said vehicle to result in gas-expansion cooling of said pressure vessel and contents; and
utilizing said longitudinal portion of said vehicle outer surface to conduct aerodynamic heating into said pressure vessel and contents in offset to said cooling thereof.

10. The method of claim 9 further including the steps of;
providing a first annular part of said pressure vessel;
providing a second complementary annular part of said pressure vessel;
uniting said first part and said second part to form a pair of circumferentially extending joints which are spaced apart both axially and radially; and
sealingly uniting said first part and said second part at said pair of joints.

11. The method of claim 9 further including the steps of providing axially extending structural interface means integral with said toroidal pressure vessel; and structurally uniting the remainder of said vehicle with said pressure vessel at said interface means.

12. The method of claim 11 wherein providing said structural interface means includes forming an axially and circumferentially extending flange on said pressure vessel.

13. The method of claim 11 wherein providing said structural interface means includes forming a circumferential array of spaced apart axially and circumferentially extending tabs on said pressure vessel.

14. A toroidal pressure vessel comprising;
a central annular part including a radially outwardly extending annular wall portion and a pair of oppositely axially extending radially inner annular wall portions;
a second annular part complementary to and axially nesting with said central annular part to define both a first annular chamber and a first pair of circumferentially extending annular joints which are spaced apart both axially and radially;
a third annular part complementary to and axially nesting with said central annular part oppositely to said second annular part to define both a second annular chamber which is axially spaced from and congruent with said first annular chamber and a second pair of circumferentially extending annular joints which are spaced apart both axially and radially;
means sealingly uniting said central part with said second part and said third part at said first and said second pairs of joints; and
means communicating said first chamber and said second chamber one with the other.

15. The invention of claim 14 wherein each of said central part, said second part, and said third part cooperatively define respective axially extending portions of a radially outwardly exposed circumferential surface, said pressure vessel also including means for structurally interfacing with an axially adjacent portion of a vehicle airframe to define a longitudinal part thereof, whereby said radially outwardly disposed pressure vessel surface defines a portion of the outer surface of said vehicle.

16. The invention of claim 14 wherein the radially inner ones of each of said first pair and said second pair of joints are axially spaced apart at opposite ends of said pressure vessel.

17. The invention of claim 14 wherein at least one of each pair of joints is of bell and spigot configuration including a truly axially extending interface and a truly radially extending interface between said central part and the respective one of said second part and said third part.

18. The invention of claim 15 wherein said means for structurally interfacing with an axially adjacent vehicle airframe portion includes one of said second annular part and said third annular part integrally defining an axially and circumferentially extending annular flange portion, said flange portion axially overlapping in part with said adjacent vehicle portion, and means intersecuring said flange and said adjacent vehicle portion.

19. The invention of claim 15 wherein said means for structurally interfacing with an axially adjacent vehicle airframe portion includes one of said second annular part and said third annular part integrally defining a circumferential array of spaced apart axially and circumferentially extending tab portions, said adjacent vehicle airframe portion axially overlapping with said plurality of tab portions, and means intersecuring said airframe portion with said plurality of tab portions.

20. The invention of claim 15 wherein said central annular part, said second annular part, and said third annular part cooperatively define a radially outwardly disposed circumferential recess axially intermediate of said first annular chamber and said second annular chamber, an axially and circumferentially extending band member spanning said circumferentially recess, said band member in part defining an outwardly disposed surface portion of said pressure vessel being in heat transfer relation with the remainder thereof.

* * * * *